(12) United States Patent
Boutakis

(10) Patent No.: US 12,233,982 B2
(45) Date of Patent: Feb. 25, 2025

(54) COMPACTABLE BICYCLE

(71) Applicant: Helix Labs Inc., North York (CA)

(72) Inventor: Peter Boutakis, East York (CA)

(73) Assignee: HELIX LABS INC., North York (CA)

( * ) Notice: Subject to any disclaimer, the term of this patent is extended or adjusted under 35 U.S.C. 154(b) by 777 days.

(21) Appl. No.: 17/429,596

(22) PCT Filed: Feb. 7, 2020

(86) PCT No.: PCT/CA2020/050167
§ 371 (c)(1),
(2) Date: Aug. 9, 2021

(87) PCT Pub. No.: WO2020/160679
PCT Pub. Date: Aug. 13, 2020

(65) Prior Publication Data
US 2022/0106006 A1    Apr. 7, 2022

Related U.S. Application Data

(60) Provisional application No. 62/804,901, filed on Feb. 13, 2019, provisional application No. 62/803,422, filed on Feb. 8, 2019.

(51) Int. Cl.
*B62K 15/00* (2006.01)
*B62J 11/13* (2020.01)
(Continued)

(52) U.S. Cl.
CPC ............. *B62K 15/006* (2013.01); *B62J 11/13* (2020.02); *B62K 21/24* (2013.01); *B62M 9/137* (2013.01); *B62M 9/138* (2013.01)

(58) Field of Classification Search
CPC ...... B62K 15/006; B62K 21/24; B62K 21/02; B62K 25/005; B62J 11/13; B62M 9/137;
(Continued)

(56) References Cited

U.S. PATENT DOCUMENTS

| 4,296,940 A | * | 10/1981 | Herbert | ................ | B62K 15/008 |
| | | | | | 280/278 |
| 11,667,349 B2 | * | 6/2023 | Tsai, Jr. | ................. | B62M 9/126 |
| | | | | | 474/80 |

(Continued)

FOREIGN PATENT DOCUMENTS

WO    WO2004024546    *    3/2004

*Primary Examiner* — Kevin Hurley
*Assistant Examiner* — Marlon A Arce
(74) *Attorney, Agent, or Firm* — Aird & McBurney LP

(57) ABSTRACT

A compactable bicycle comprising a frame including a first and second frame portions wherein the frame is unfoldable to a use position for riding by the rider and is foldable to a storage position for storage. The bicycle includes: a rear brake, a rear brake lever, a rear break cable passes through a first cable guide, and a brake cable biasing member that is positioned to urge the rear brake cable back through the first cable guide to be between the first cable guide and the rear brake lever: front and rear wheel connectors to hold the front and rear wheels together: a crank, a front sprocket, a rear cassette, rear sprockets, a chain, and a derailleur; a chain guide that is positioned to engage the chain and to limit a lateral angle of the chain relative to the rear sprocket: or first and second frame element locking surfaces and apertures, and a plunger movable to a clamping position and to a release position.

7 Claims, 19 Drawing Sheets

(51) Int. Cl.
*B62K 21/24* (2006.01)
*B62M 9/137* (2010.01)
*B62M 9/138* (2010.01)

(58) Field of Classification Search
CPC B62M 9/138; B62M 2009/007; B62M 9/125; B62M 9/127; B62M 9/128; B62M 25/04; B62L 3/02
See application file for complete search history.

(56) References Cited

U.S. PATENT DOCUMENTS

2004/0177713 A1* 9/2004 Shahana ............... B62M 9/125
74/473.14
2014/0225346 A1* 8/2014 Bettin ................... B62K 19/32
280/236
2022/0106006 A1* 4/2022 Boutakis ............... B62K 21/24

* cited by examiner

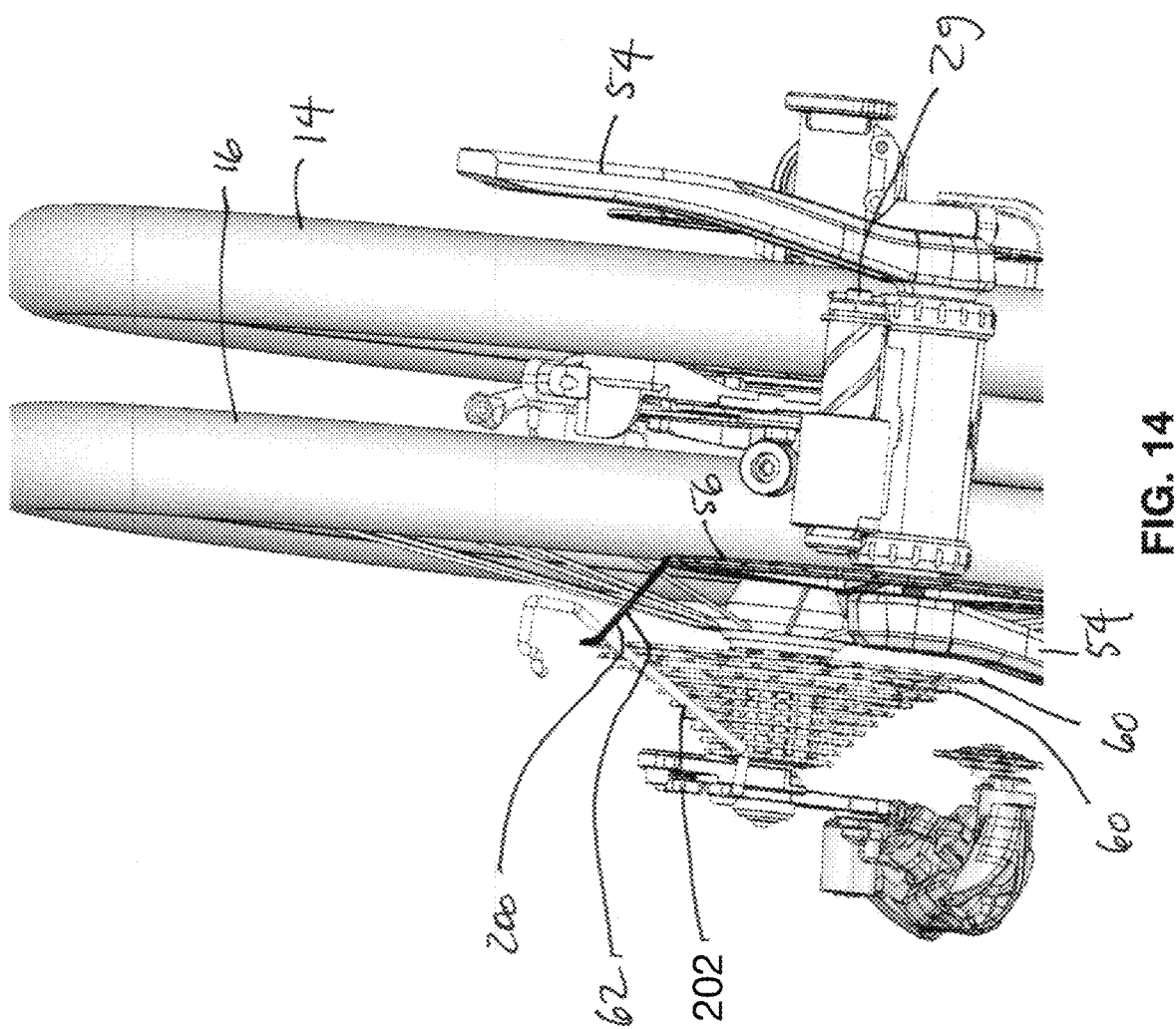

COMPACTABLE BICYCLE

CROSS-REFERENCE TO RELATED APPLICATIONS

This application is a national phase entry of PCT/CA2020/050167 filed Feb. 7, 2020, which claims the benefit of U.S. Provisional application Nos. 62/803,422 and 62/804,901 filed February 8 and 13, 2019, respectively, the contents of both of which are incorporated herein by reference in their entirety.

FIELD

The specification relates generally to folding bicycles.

BACKGROUND OF THE DISCLOSURE

Folding bicycles can provide the rider with the mobility of a bicycle while being foldable into a relatively small volume for storage. In some instances, the folding of the bicycle introduces some compromises in the function of certain subsystems of the bicycle. For example, by folding the frame of the bicycle the structural integrity of the frame is important to consider. Additionally, for bicycles in which the rear wheel moves relative to the crank during the folding or unfolding process, problems can arise with chain tension, and with cable routing for cables that lead to the rear brakes and derailleur. Improvements in these areas and others would be beneficial to improving the experience of owning and riding a folding bicycle.

SUMMARY OF THE DISCLOSURE

In an aspect, a compactable bicycle is provided and includes a frame, a rear brake, a rear brake lever, a rear brake cable, and a brake cable biasing member. The frame includes a first frame portion and a second frame portion. The first frame portion has a steering structure rotatably mounted thereto. The steering structure has a front wheel rotatably connected thereto. The front wheel is positionable for rolling engagement with a ground surface for supporting the compactable bicycle thereon. The steering structure further includes a handlebar positioned to be gripped by a rider for steering the front wheel during use of the compactable bicycle. The second frame portion has a rear wheel rotatably connected thereto. The rear wheel is positionable for rolling engagement with the ground surface for supporting the compactable bicycle thereon. The compactable bicycle is unfoldable to a use position for riding by the rider, and is foldable to a storage position for storage. The rear brake is actuatable to brake the rear wheel. The rear brake lever is positioned on the handlebar for actuation by the rider. The rear brake cable extends between the rear brake lever and the rear brake to operatively connect the rear brake lever to the rear brake, and passes through a first cable guide on the first frame portion en route between the rear brake lever and the rear brake. The first segment of the rear brake cable extends between the rear brake lever and the first cable guide when the compactable bicycle is in the use position. A change in position of the first and second frame portions relative to one another during folding of the compactable bicycle to the storage position pulls a first portion of the first segment of the rear brake cable through the first cable guide in a first direction. The brake cable biasing member is positioned to urge the first portion of the first segment of the rear brake cable back through the first cable guide to be between the first cable guide and the rear brake lever.

In another aspect, a compactable bicycle is provided and includes a frame that includes a first frame portion and a second frame portion. The first frame portion has a steering structure rotatably mounted thereto. The steering structure has a front wheel rotatably connected thereto. The front wheel is positionable for rolling engagement with a ground surface for supporting the compactable bicycle thereon. The steering structure further includes a handlebar positioned to be gripped by a rider for steering the front wheel during use of the compactable bicycle. The second frame portion has a rear wheel rotatably connected thereto. The rear wheel is positionable for rolling engagement with the ground surface for supporting the compactable bicycle thereon. The compactable bicycle is positionable in a use position for riding by a rider. In the use position the first and second frame portions are unfolded to an unfolded position. The compactable bicycle is positionable in a storage position for storage. In the storage position the first and second frame portions are folded to a folded position. In the storage position the front wheel and the rear wheel are next to each other. The front wheel has a front wheel connector and the rear wheel has a rear wheel connector that is releasably connectable to the front wheel connector to hold the front and rear wheels together.

In another aspect, a compactable bicycle is provided and includes a frame, a crank and a front sprocket, a rear cassette, a chain, and a derailleur. The frame includes a first frame portion and a second frame portion. The first frame portion has a steering structure rotatably mounted thereto. The steering structure has a front wheel rotatably connected thereto. The front wheel is positionable for rolling engagement with a ground surface for supporting the compactable bicycle thereon. The steering structure further includes a handlebar positioned to be gripped by a rider for steering the front wheel during use of the compactable bicycle. The second frame portion has a rear wheel rotatably connected thereto. The rear wheel is positionable for rolling engagement with the ground surface for supporting the compactable bicycle thereon. The compactable bicycle is positionable in a use position for riding by a rider. In the use position the first and second frame portions are unfolded to an unfolded position. The compactable bicycle is positionable in a storage position for storage. In the storage position the first and second frame portions are folded to a folded position. The crank and the front sprocket are rotatable about a crank axis. The rear cassette is on the rear wheel and has a plurality of rear sprockets. The chain operatively connects the front sprocket and crank to the rear cassette. When the first and second frame portions are in the unfolded position, the front sprocket and the rear cassette have a first center distance, and when the first and second frame portions are in the folded position, the front sprocket and the rear cassette have a second center distance that is shorter than the first center distance. The derailleur is actuatable to change which of the rear sprockets the chain is on. The derailleur includes a derailleur base that is movably connected to the frame, a derailleur arm that is movably connected to the derailleur base, a derailleur arm biasing member and a derailleur base biasing member. The derailleur arm has a derailleur arm sprocket rotatably mounted thereon, which is engaged with the chain, such that movement of the derailleur arm relative to the derailleur base controls tension in the chain. The derailleur arm biasing member urges the derailleur arm in a direction that applies tension to the chain when the first and second frame portions are in the unfolded position. The derailleur base biasing member urges the derailleur base in a direction that applies tension to the chain when the first and second frame portions are in the folded position.

In another aspect, a compactable bicycle is provided and includes a frame, a crank and a front sprocket that are rotatable about a crank axis; a rear sprocket, a chain and a chain guide. The frame includes a first frame portion and a second frame portion. The first frame portion has a steering structure rotatably mounted thereto. The steering structure has a front wheel rotatably connected thereto. The front wheel is positionable for rolling engagement with a ground surface for supporting the compactable bicycle thereon. The steering structure further includes a handlebar positioned to be gripped by a rider for steering the front wheel during use of the compactable bicycle. The second frame portion has a rear wheel rotatably connected thereto. The rear wheel is positionable for rolling engagement with the ground surface for supporting the compactable bicycle thereon. The compactable bicycle is positionable in a use position for riding by a rider. In the use position the first and second frame portions are unfolded to an unfolded position. The compactable bicycle is positionable in a storage position for storage. In the storage position the first and second frame portions are folded to a folded position. The rear sprocket is on the rear wheel. The chain operatively connects the front sprocket and crank to the rear sprocket. When the first and second frame portions are in the unfolded position, the front sprocket and the rear sprocket have a first lateral spacing from one another, and when the first and second frame portions are in the folded position, the front sprocket and the rear sprocket have a second lateral spacing from one another that is larger than the first lateral spacing from one another. A first span of the chain extends directly from the front sprocket to the rear sprocket. The chain guide is positioned to be spaced from the chain when the front sprocket and the rear sprocket have the first lateral spacing from one another, and is positioned to engage the chain and to limit a lateral angle of the chain relative to the rear sprocket when the front sprocket and the rear sprocket have the second lateral spacing from one another.

In another aspect, a compactable bicycle is provided and includes a frame. The frame includes a base frame portion having a rear wheel mounted thereto for engagement with a ground surface for supporting the compactable bicycle thereon and a steering structure rotatably mounted to the base frame portion and having a front wheel connected thereto for engagement with the ground surface for supporting the compactable bicycle thereon. At least one of the base frame portion and the steering structure includes a first frame element having a first frame element locking surface, a first end, and a first aperture at the first end, and a second frame element having a second frame element locking surface, a second end and a second aperture at the second end. The first and second frame elements are positionable in a first position in which the first and second apertures are generally aligned with one another and the first and second frame element locking surfaces generally face away from one another, and in a second position in which the first and second apertures are generally unaligned with one another. The plunger has a first plunger locking surface, a second plunger locking surface. The plunger is movable to a clamping position in which the plunger extends in both the first and second apertures such that the first plunger locking surface engages the first frame element locking surface and the second plunger locking surface engages the second frame element locking surface. The plunger is movable to a release position in which the plunger retracts from the second aperture sufficiently to permit the first and second ends to be separated from one another. The plunger includes a plunger body having a first plunger body portion and a second plunger body portion. The first and second plunger body portions are connected together via a threaded connection. Tightening of the threaded connection clamps the first and second plunger locking surfaces onto the first and second frame element locking surfaces when the plunger is in an engagement position.

BRIEF DESCRIPTION OF THE DRAWINGS

For a better understanding of the various embodiments described herein and to show more clearly how they may be carried into effect, reference will now be made, by way of example only, to the accompanying drawings.

FIG. 14 is another perspective view of a portion of the bicycle, illustrating the chain guide.

DETAILED DESCRIPTION

Figure 1:
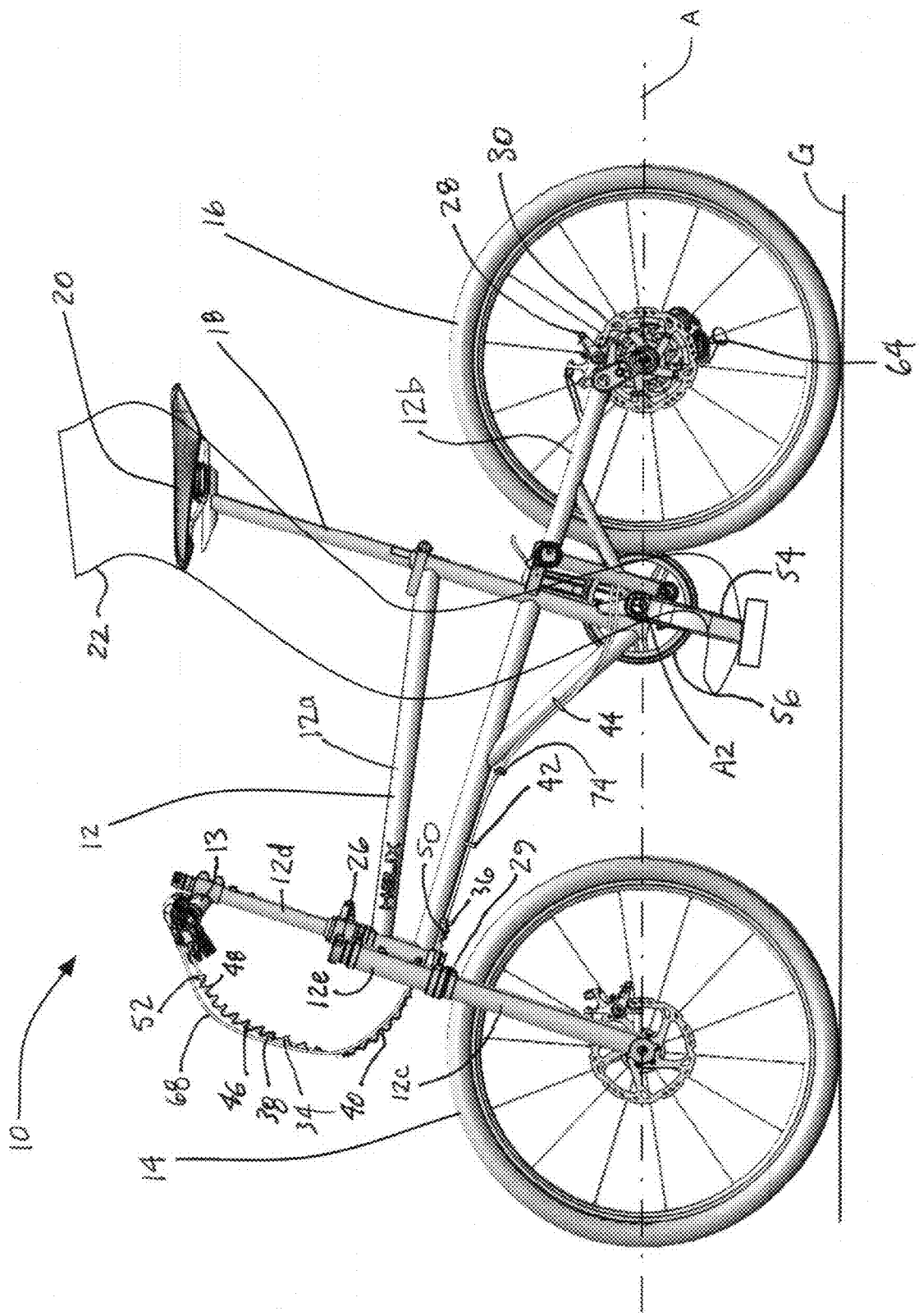
FIG. 1 is a side elevation view of a bicycle in accordance with an embodiment of the present disclosure, in a use position.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Reference is made to FIG. 1. A bicycle 10 is provided that includes a bicycle frame 12, a first wheel 14 and a second wheel 16. The frame 12 and first and second wheels 14 and 16 define a longitudinal axis A for the bicycle, which is the direction that the bicycle travels in on level ground when its first wheel 14 (the front wheel) is straight. The bicycle frame 12 may be any suitable type of bicycle frame that is known in the art. The bicycle frame 12 includes a seat post 18 that holds a bicycle seat 20.

The frame 12 comprises a main frame portion 12a, a rear frame portion 12b, a front wheel support 12c, a handlebar support 12d to which a handlebar 13 is mounted, and a central steering portion 12e. These frame portions 12a-12e may also be referred to as first, second, third and fourth frame portions 12a, 12b, 12c, 12d and 12e. For greater certainty, it will be understood, that any one of these frame portions 12a-12e may be considered the 'first' frame portion, any one may be considered the second, any one may be considered the third and any one may be considered the fourth. Different frame portions may be considered first, second, third or fourth in different contexts herein. Furthermore, any combination of these frame portions 12a-12e may be considered the 'first' frame portion and any remaining frame portions 12a-12e, or any combination of remaining frame portions 12a-12e may be considered a second frame portion. Any limitations in these regards will be described below.

The handlebar support 12d, the handlebar 13, the central steering portion 12e and the front wheel support 12c may together be referred to as a steering structure, which is rotatably mounted to the frame portion 12a. The steering structure has the front wheel 14 rotatably connected thereto. As shown in FIG. 1, the front wheel 14 is positionable for rolling engagement with a ground surface (shown at G) for supporting the compactable bicycle 10 thereon. The handlebar 13 is positioned to be gripped by a rider for steering the front wheel 14 during use of the compactable bicycle 10. The lower half of the rider is shown schematically in outline at 22 in FIG. 1.

The rear frame portion 12b has the rear wheel 16 rotatably connected thereto. As shown in FIG. 1, the rear wheel 16 is positionable for rolling engagement with the ground surface G for supporting the compactable bicycle 10 thereon.

Figure 3:
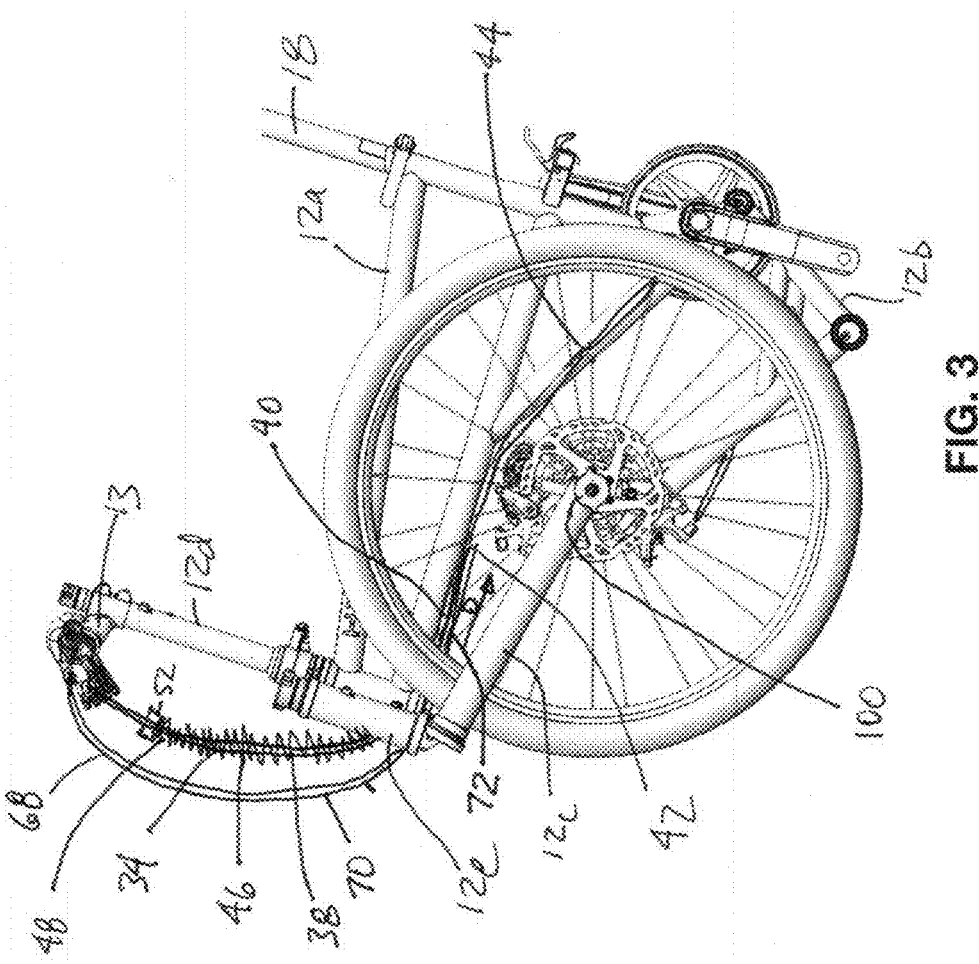
FIG. 3 is a perspective view of the bicycle shown in FIG. 1, in a storage position.
Figure 4:
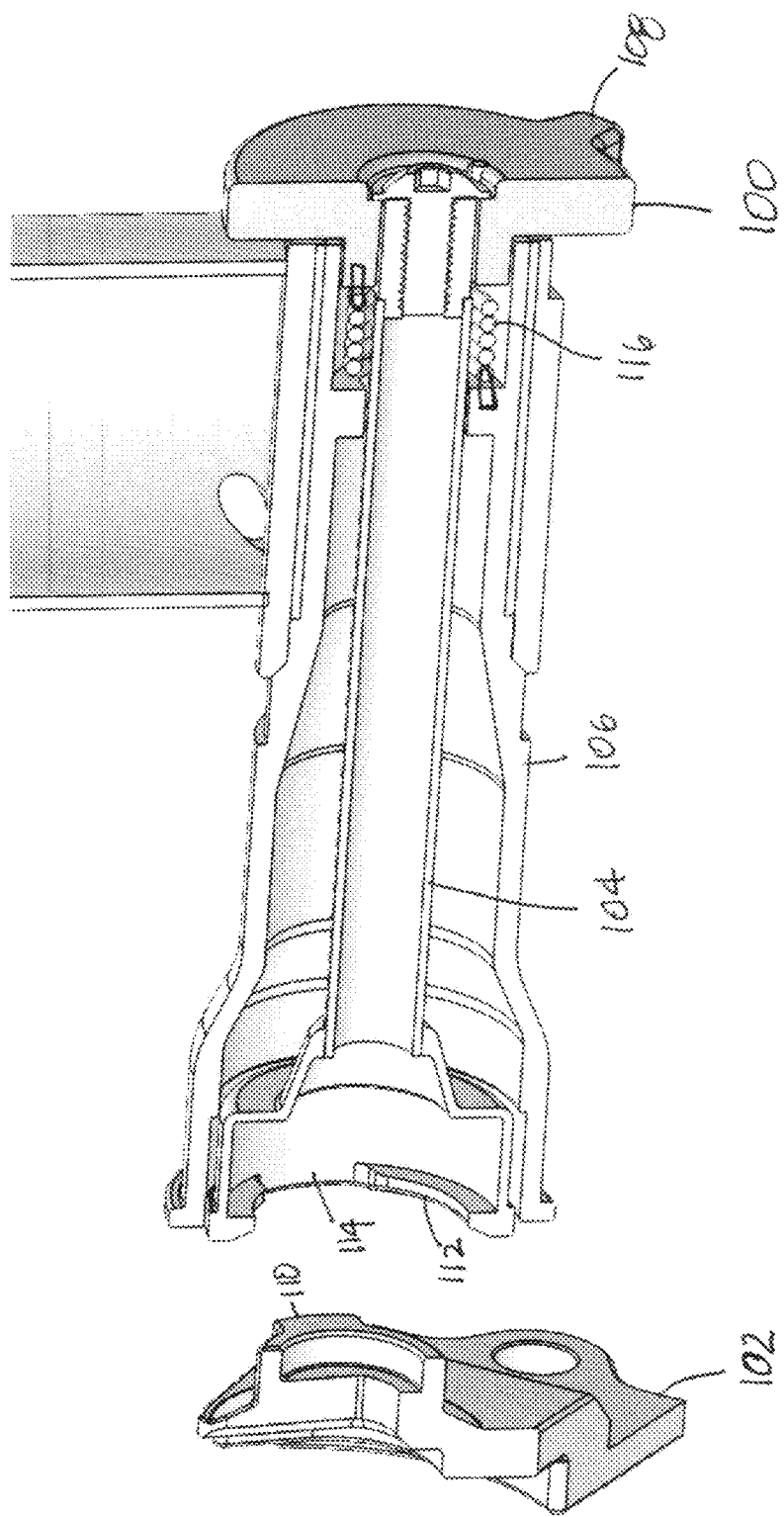
FIG. 4 is a magnified sectional perspective view of a portion of the bicycle shown in FIG. 1, showing a wheel-to-wheel connection structure.
Figure 5:
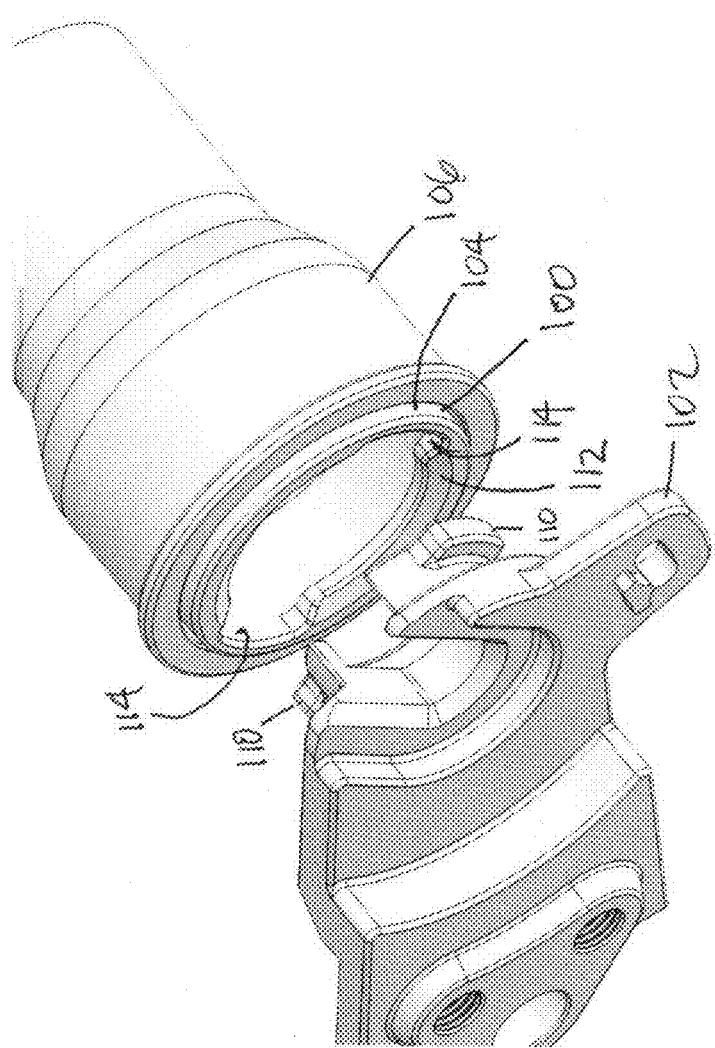
FIG. 5 is a magnified perspective view of a portion of the wheel-to-wheel connection structure shown in FIG. 4.
Figure 6:
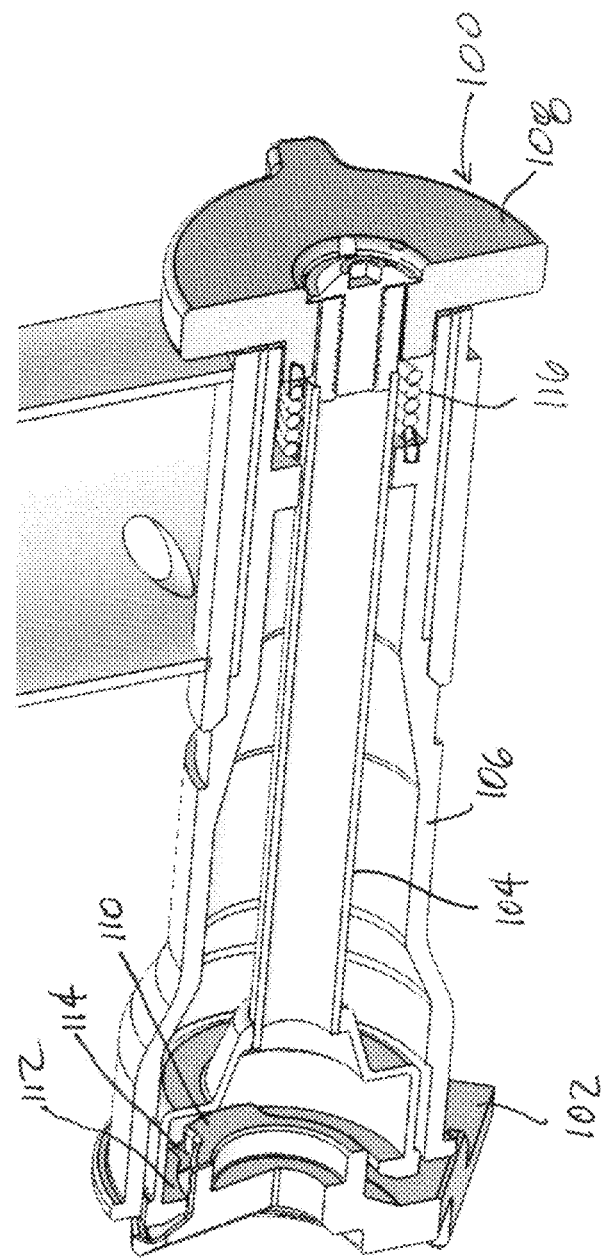
FIG. 6 is another magnified sectional perspective view of a portion of the bicycle shown in FIG. 1, showing a wheel-to-wheel connection structure.
Figure 7:
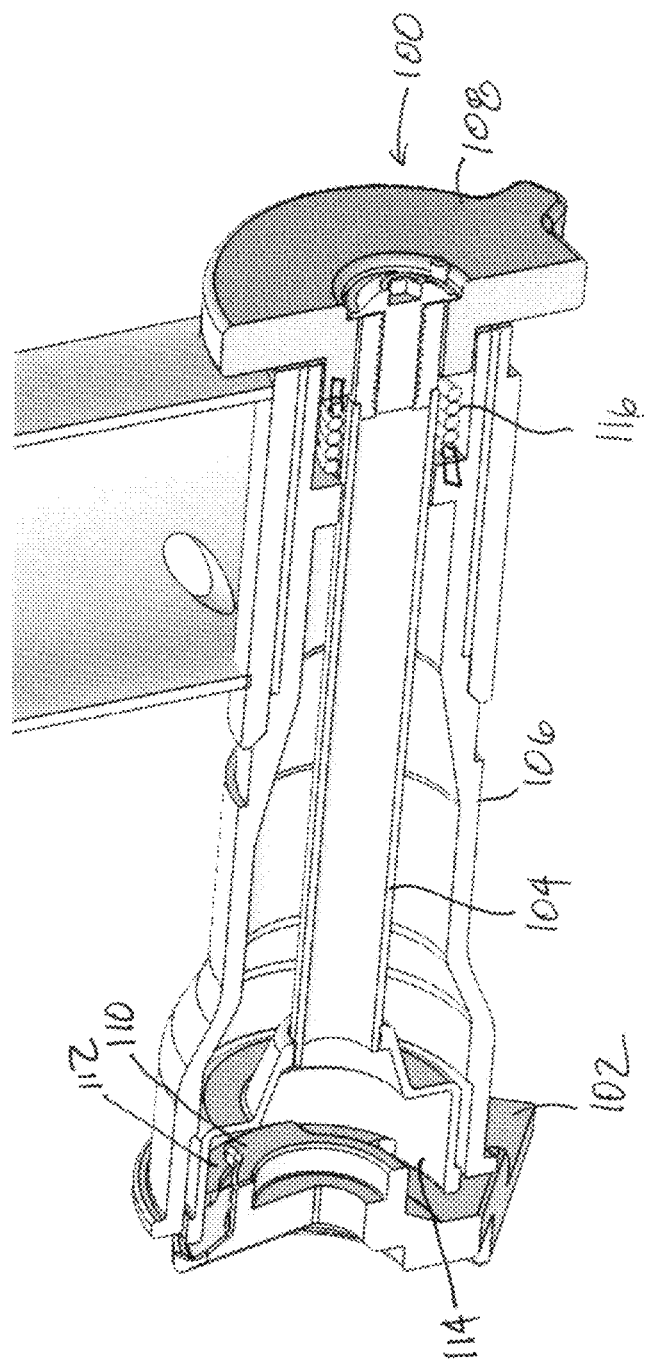
FIG. 7 is another magnified sectional perspective view of a portion of the bicycle shown in FIG. 1, showing a wheel-to-wheel connection structure.

The compactable bicycle 10 is unfoldable to a use position for riding by the rider 22 (as shown in FIG. 1), and is foldable to a storage position for storage (as shown in FIG. 3). To reach the storage position shown in FIG. 3, the rear frame portion 12b is folded about a pivot connection 29 relative to the main frame portion 12a. The pivot connection 29 defines a laterally extending axis and permits (and may optionally guide) the rear frame portion 12b to translate laterally relative to the main frame portion 12a such that the rear wheel 16 ends up on one side of the main frame portion 12a. An example of such a pivot connection 29 that provides this function is shown at 29 in PCT publication WO2018064763, the contents of which are incorporated herein by reference in their entirety.

In addition, the front wheel support 12c may be folded about another pivot connection 29 relative to the central steering portion 12e, which may permit (or guide) translation of the front wheel support 12c, such that the front wheel 14 ends up on the other side of the main frame portion 12a.

In some embodiments, the compactable bicycle 10 may be further foldable beyond the position shown in FIG. 3. For example, the handlebar support 12d may be connected to the central steering portion 12e via a hinge 26 and may be lockable in the position shown in FIGS. 1-3 or may be releasable and folded out of the way (not shown). Additionally, the seat post 18 may be releasable and slide down into the main frame portion 12a.

Figure 2:
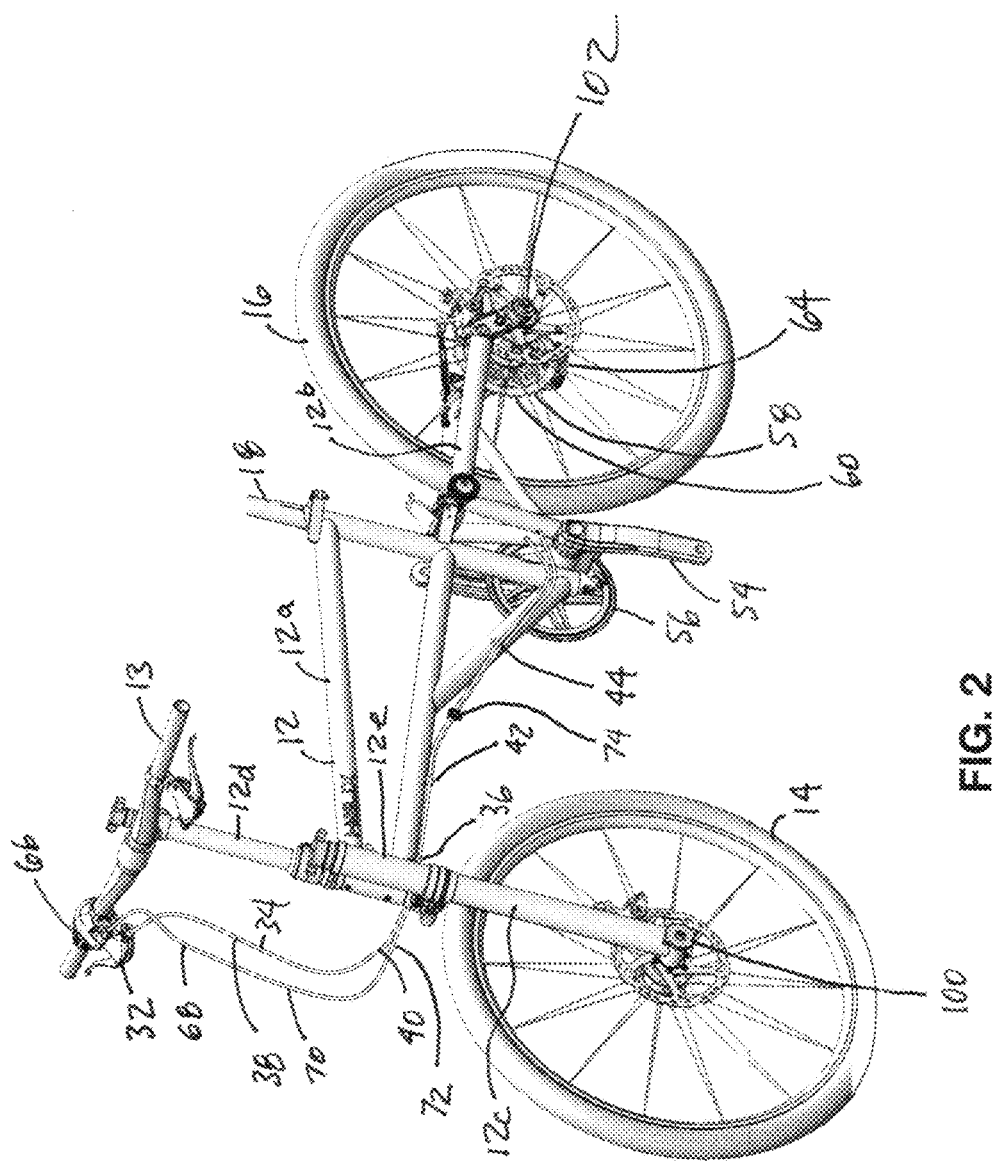
FIG. 2 is a perspective view of the bicycle shown in FIG. 1.

FIGS. 1, 2 and 3 show a cable management system for the compactable bicycle 10. For the purposes of the description cable management system the first frame portion may include the main frame portion 12a and the steering structure, and the second frame portion may include the rear frame portion 12b.

As can be seen in FIGS. 1-3, the compactable bicycle 10 includes a rear brake 28 that is actuatable to brake the rear wheel 16. The rear brake 28 may be a caliper that is positioned to clamp a disc 30 on the rear wheel 16.

As seen best in FIG. 2, the compactable bicycle 10 further includes a rear brake lever 32 positioned on the handlebar 13 for actuation by the rider 22. The compactable bicycle 10 further includes a rear brake cable 34 that extends between the rear brake lever 32 and the rear brake 28 to operatively connect the rear brake lever 32 to the rear brake 28. The rear brake cable 34 passes through a first cable guide 36 on the first frame portion en route between the rear brake lever 32 and the rear brake 28. A first segment 38 of the rear brake cable 34 extends between the rear brake lever 32 and the first cable guide 36 when the compactable bicycle 10 is in the use position (FIGS. 1 and 2). A change in position of the first and second frame portions relative to one another during folding of the compactable bicycle 10 to the storage position (FIG. 3) pulls a first portion 40 of the first segment 38 of the rear brake cable 34 through the first cable guide 36 in a first direction (shown by arrow D). The compactable bicycle 10 may include additional cable guides shown at 42 and 44 in the example shown. The compactable bicycle 10 may further include a brake cable biasing member 46 (FIGS. 1 and 3, not shown in FIG. 2) that is positioned to urge the first portion 40 of the first segment 38 of the rear brake cable 34 back through the first cable guide 36 to be between the first cable guide 36 and the rear brake lever 32. The brake cable biasing member 46 may be a compression spring that has a first end 48 that is engaged with the first segment 38 and a second end 50 that is engaged with the first frame portion. In the embodiment shown the brake cable biasing member 46 is a compression spring that surrounds the rear brake cable 34.

The first end 48 is engaged with a cable clamp 52 on the rear brake cable 34, and the second end 50 is engaged with the first cable guide 36.

Additionally, the compactable bicycle 10 has a crank 54 and a front sprocket 56 that are rotatable about a crank axis A2, and further includes a rear cassette 58 (FIG. 2) on the rear wheel 16 having a plurality of rear sprockets 60 (only one rear sprocket 60 is shown in FIG. 2, however, additional rear sprockets 60 are shown in other figures such as FIGS. 12-16). The compactable bicycle 10 further includes a chain 62 (FIGS. 12-14) that operatively connects the front sprocket 56 and crank 54 to the rear cassette 58. It will be noted that while the front sprocket 56 is shown as being alone, it is not intended to be limiting; the front sprocket 56 may be one of a plurality of front sprockets making up a front cassette. A derailleur 64 (best seen in FIG. 8) is provided and is actuatable to change which of the rear sprockets the chain 62 is on, as is known in the art of cycling. A gear control 66 is positioned on the handlebar 13 for actuation by the rider 22. In the present example, the gear control 66 is a grip shifter, however, any suitable type of gear control 66 may be provided. A derailleur cable 68 is provided and extends between the gear control 66 and the derailleur 64 to operatively connect the gear control 66 to the derailleur 64, and passes through the first cable guide 36 on the first frame portion en route between the gear control 66 and the derailleur 64.

A first segment 70 of the derailleur cable 68 extends between the gear control 66 and the first cable guide 36 when the compactable bicycle 10 is in the use position. The change in position of the first and second frame portions relative to one another during folding of the compactable bicycle 10 to the storage position pulls a first portion 72 of the first segment 70 of the derailleur cable 68 through the first cable guide 68 in the first direction D. However, in the present example, the derailleur cable 68 is connected to the rear brake cable 34 (e.g. via small plastic ties shown at 74 in FIGS. 1 and 2) such that urging of the first portion 40 of the first segment 38 of the rear brake cable 34 back through the first cable guide 36 by the brake cable biasing member 46 also urges the first portion 72 of the first segment 70 of the derailleur cable 68 back through the first cable guide 36 to be between the first cable guide 36 and the gear control 66. Providing the brake cable biasing member 46 inhibits the rear brake cable 34 from tangling when the compactable bicycle 10 is unfolded in the event that it resists passing back through any of the cable guides 36, 42 and 44.

The compactable bicycle 10 may further include a front brake lever and a front brake which are connected via a front brake cable (not shown), and may further include a front derailleur (not shown) and a front gear control (not shown) in embodiments in which the compactable bicycle 10 has a plurality of front sprockets 56.

It will be noted that the brake cable biasing member 46 need not be on the rear brake cable 34 directly. For example, it is possible for the brake cable biasing member 46 to be on the derailleur cable 68 and still to urge the rear brake cable 34 as described in embodiments wherein the rear brake cable 34 and the derailleur cable 68 are connected to one another.

FIGS. 4-7 illustrate a wheel-to-wheel connection structure for the compactable bicycle 10. As can be seen, (best seen in FIGS. 12-14), in the storage position the front wheel 14 and the rear wheel 16 may be next to each other. In the present example, the front wheel 14 and the rear wheel 16 may be next to each other albeit on either side of the main frame portion 12*a*. The front wheel 14 has an optional front wheel connector 100 (FIGS. 2 and 4-7) and the rear wheel 16 has an optional rear wheel connector 102 (FIGS. 2 and 4-7) that is releasably connectable to the front wheel connector 100 to hold the front and rear wheels 14 and 16 together (and optionally parallel and coaxial with one another) (FIGS. 3 and 12-14). In the embodiment shown, the rear wheel connector 102 is a fixed member and the front wheel connector 100 includes a rotatable member 104 that is rotatable (in a front wheel support shaft 106 that is provided to support the front wheel 14) between a release position (FIG. 6) wherein the front wheel connector 100 is separable from the fixed member 102, and a locking position (FIG. 7) in which the front wheel connector (100) is captured on the fixed member 102. In the example shown the rotatable member 104 has a handle 108 that is accessible by the rider 22 when the compactable bicycle 10 is in the storage position, which permits the rider 22 to turn the rotatable member 104 to connect to the fixed member 102.

In the present example, the fixed member 102 has at least one ear 110 (two ears 110 in the present example) and the rotatable member 104 has a radial lip 112 with at least one ear pass-through 114 (two ear pass-throughs 114 in the present example). In the release position shown in FIG. 6, the at least one ear 110 is aligned with the at least one ear pass-through 114 permitting the rotatable member 104 to be removed from the fixed member 102. In the locking position shown in FIG. 7, the at least one ear 110 is captured on the radial lip 112 because it is misaligned with the at least one ear pass-through 114.

In the present example, the front wheel connector further includes a rotatable member biasing member 116 that urges the rotatable member 104 towards the locking position. In the present example, the rotatable member biasing member 116 is a torsion spring that acts between the rotatable member 104 and the front wheel support shaft 106 (e.g. via spring tangs that extend into apertures in the rotatable member 104 and the front wheel support shaft 106, respectively).

In the present example, connection of the front wheel connector 100 and the rear wheel connector 102 to one another prevents the first and second frame portions from returning to the unfolded position from the folded position, even though there is nothing further holding the first and second frame portions in the folded position, thereby eliminating the need for a separate locking mechanism for each of the frame portions 12*b* and 12*c* to connect to something when they are folded.

It will be noted that even if the rotatable member 104 and the fixed member 102 do not directly contact the front and rear wheels 14 and 16 respectively, the front wheel connector 100 and the rear wheel connector 102 may be considered, for the purposes of the present disclosure to be on, or at least associated with, the front wheel 14 and the rear wheel 16, respectively.

Figure 8:
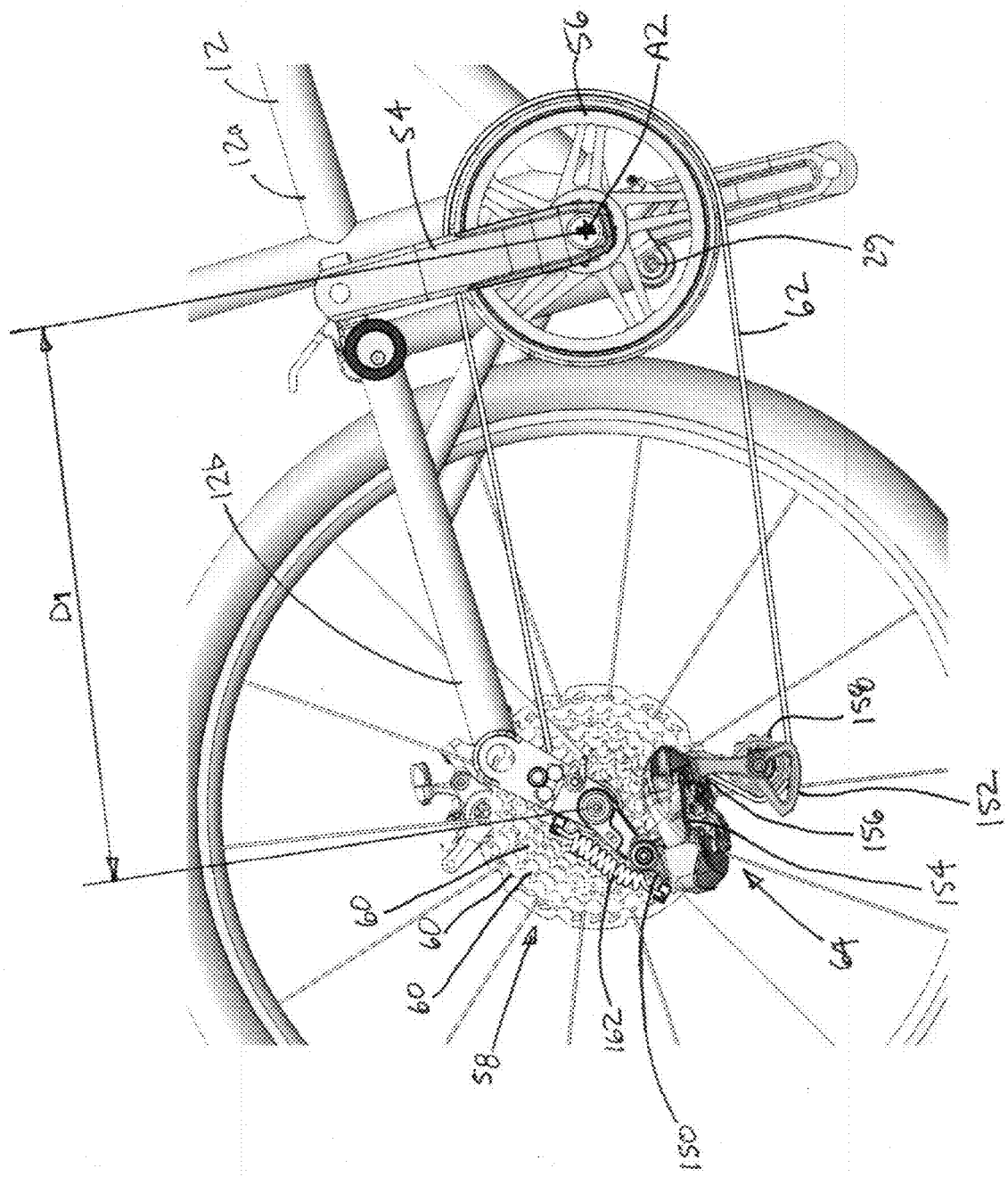
FIG. 8 is a side elevation view of the bicycle, illustrating a derailleur.
Figure 9:
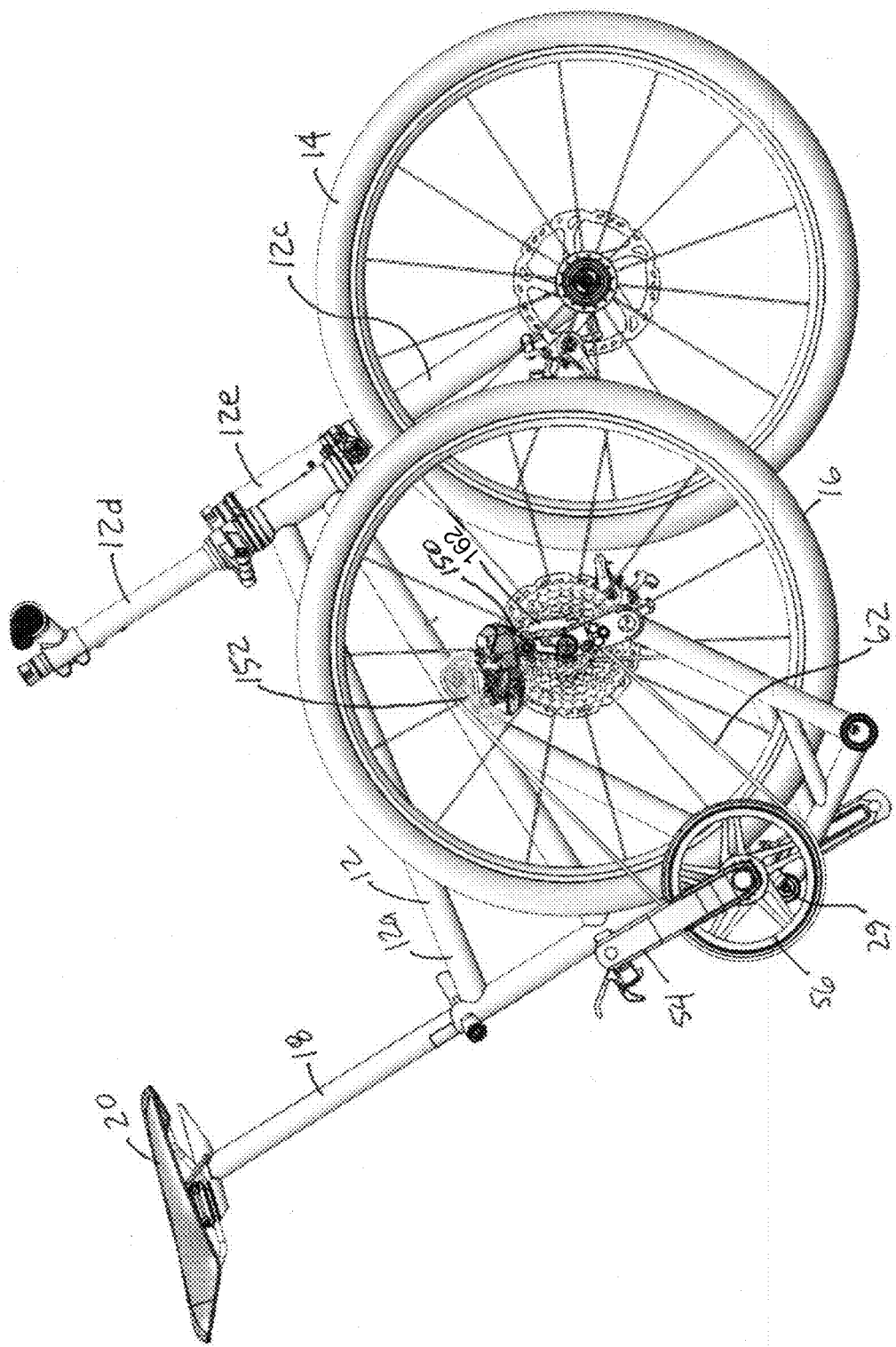
FIG. 9 is a side elevation view of the bicycle in a partially folded position.
Figure 10:
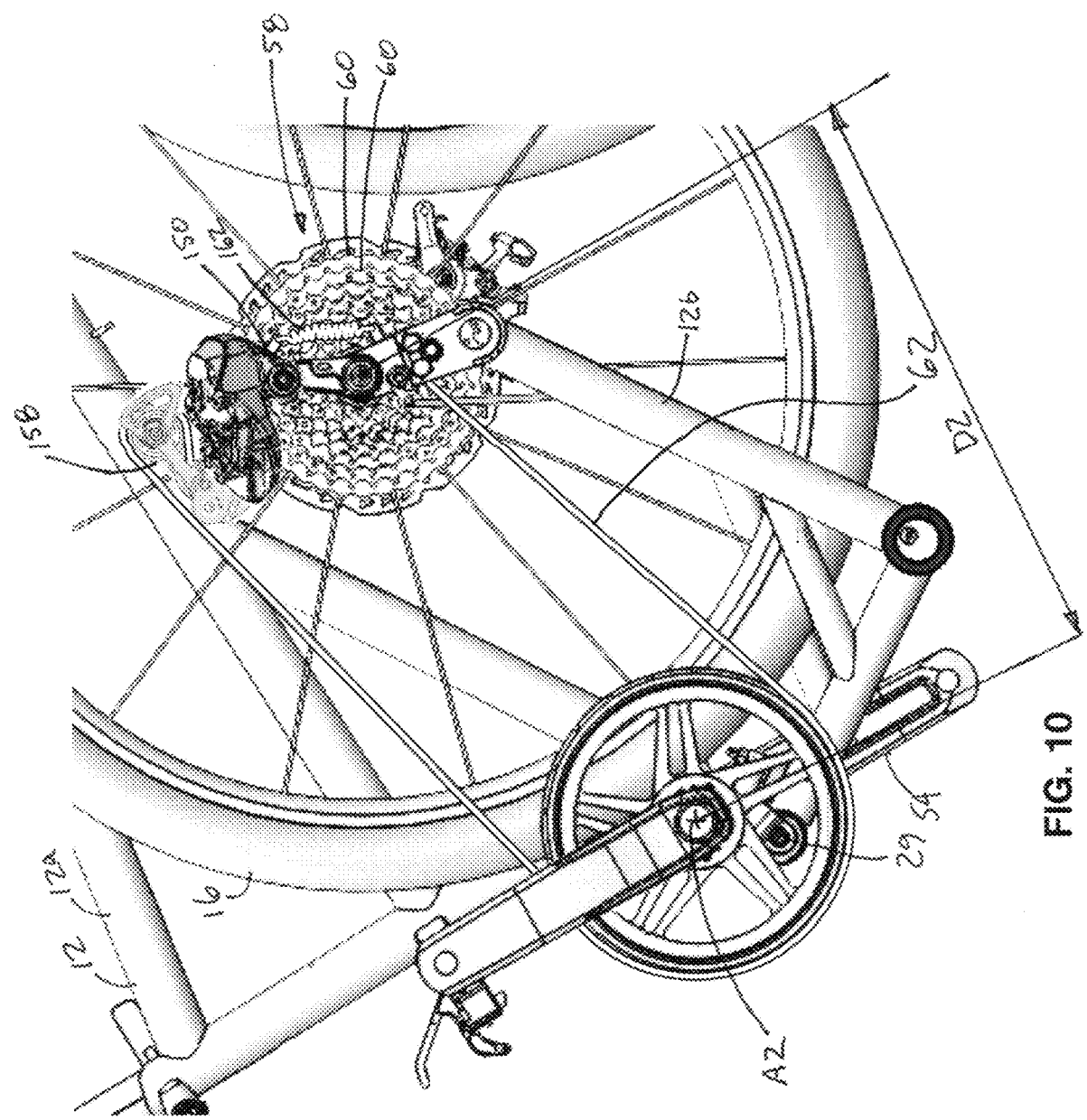
FIG. 10 is a magnified side elevation view of the derailleur while the bicycle is in the partially folded position shown in FIG. 9.
Figure 11:
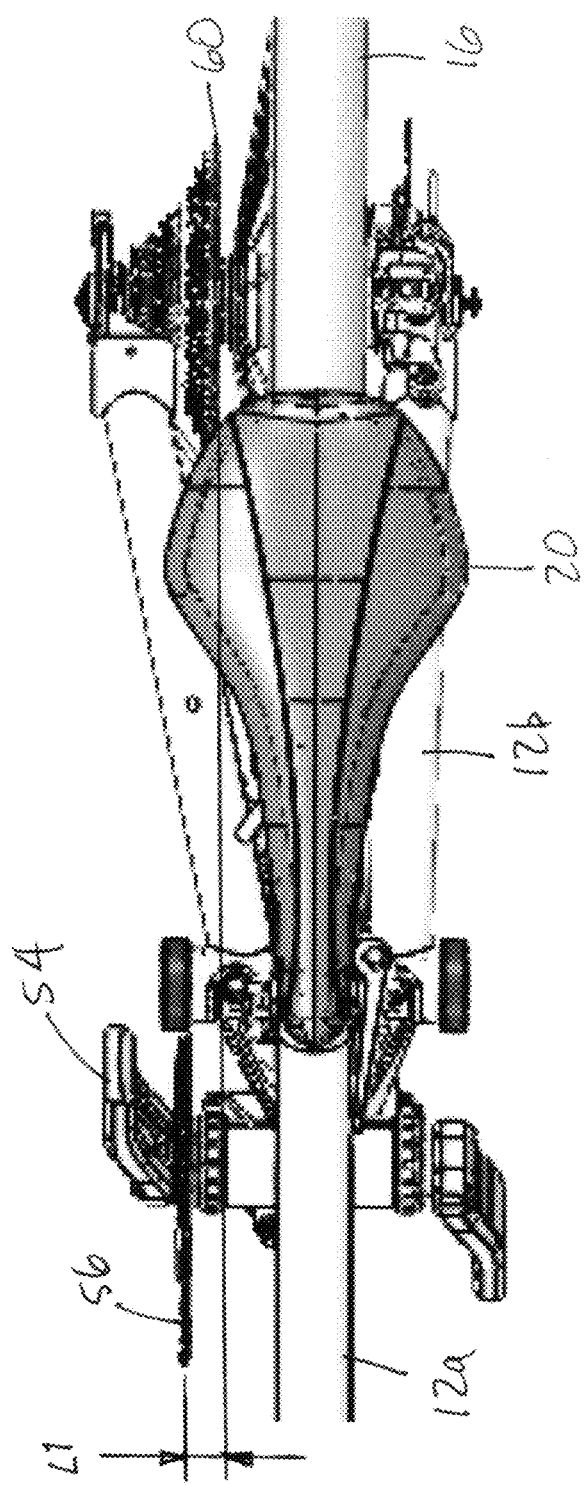
FIG. 11 is a top plan view of a portion of the bicycle in the use position.
Figure 12:
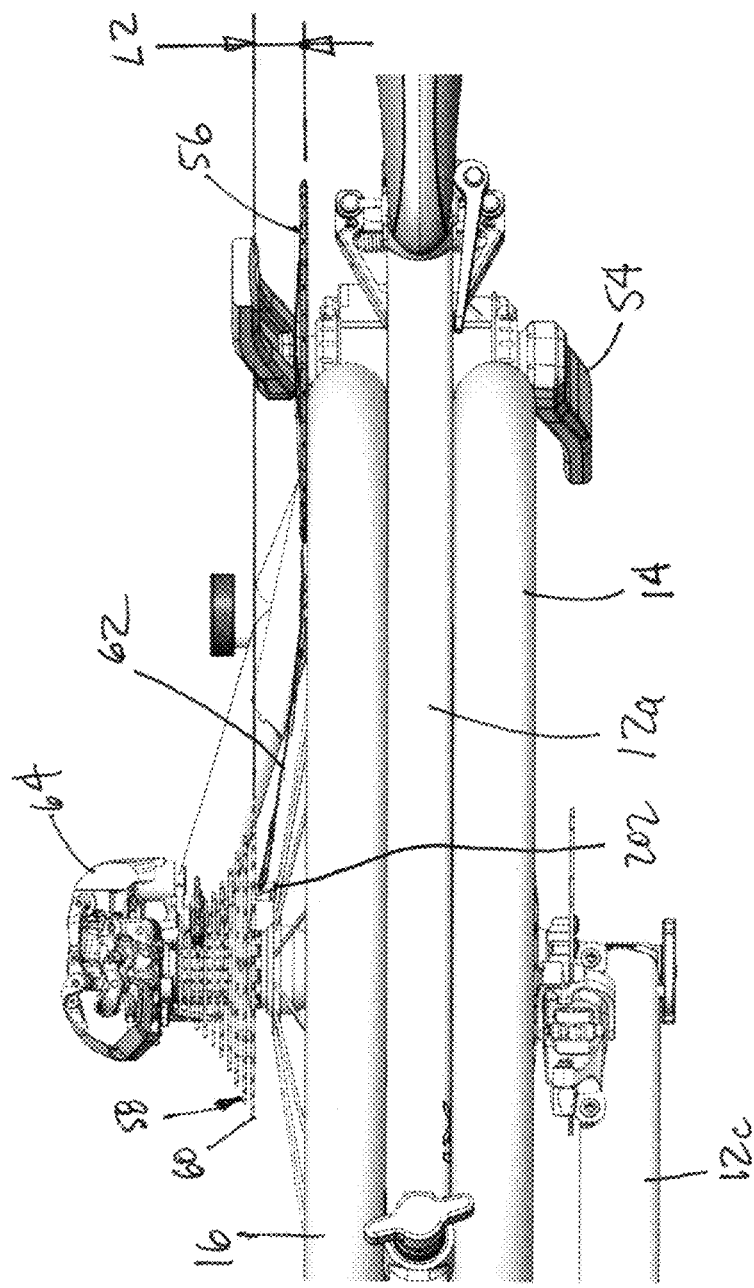
FIG. 12 is a top plan view of a portion of the bicycle in the storage position.

FIGS. 8-10 illustrate an improvement to the derailleur 64. As can be seen, when the first and second frame portions are in the unfolded position (FIG. 8), the front sprocket 56 and the rear cassette 58 have a first center distance D1, and when the first and second frame portions are in the folded position (FIGS. 9 and 10), the front sprocket 56 and the rear cassette 58 have a second center distance D2 that is shorter than the first center distance D1.

The derailleur 64 in the present example includes a derailleur base 150 that is movably connected to the frame 12 (in particular the second frame portion). It will be noted that derailleur bases of the prior art are normally fixedly connected to the frame of the bicycle to which they are mounted. The derailleur 64 further includes a derailleur arm 152 that is movably connected to the derailleur base 150. In the present example, (as is known in the art of derailleurs) the derailleur arm 152 is movably (e.g. pivotably) connected to the derailleur base 150 via a derailleur linkage 154 that is movably connected to the derailleur base 150 and is actuatable to move a jockey sprocket 156 relative to the rear cassette 58 to change which of the rear sprockets 60 the chain 62 is on. The derailleur arm 152 is pivotably connected to the derailleur linkage 154.

Figure 8A:
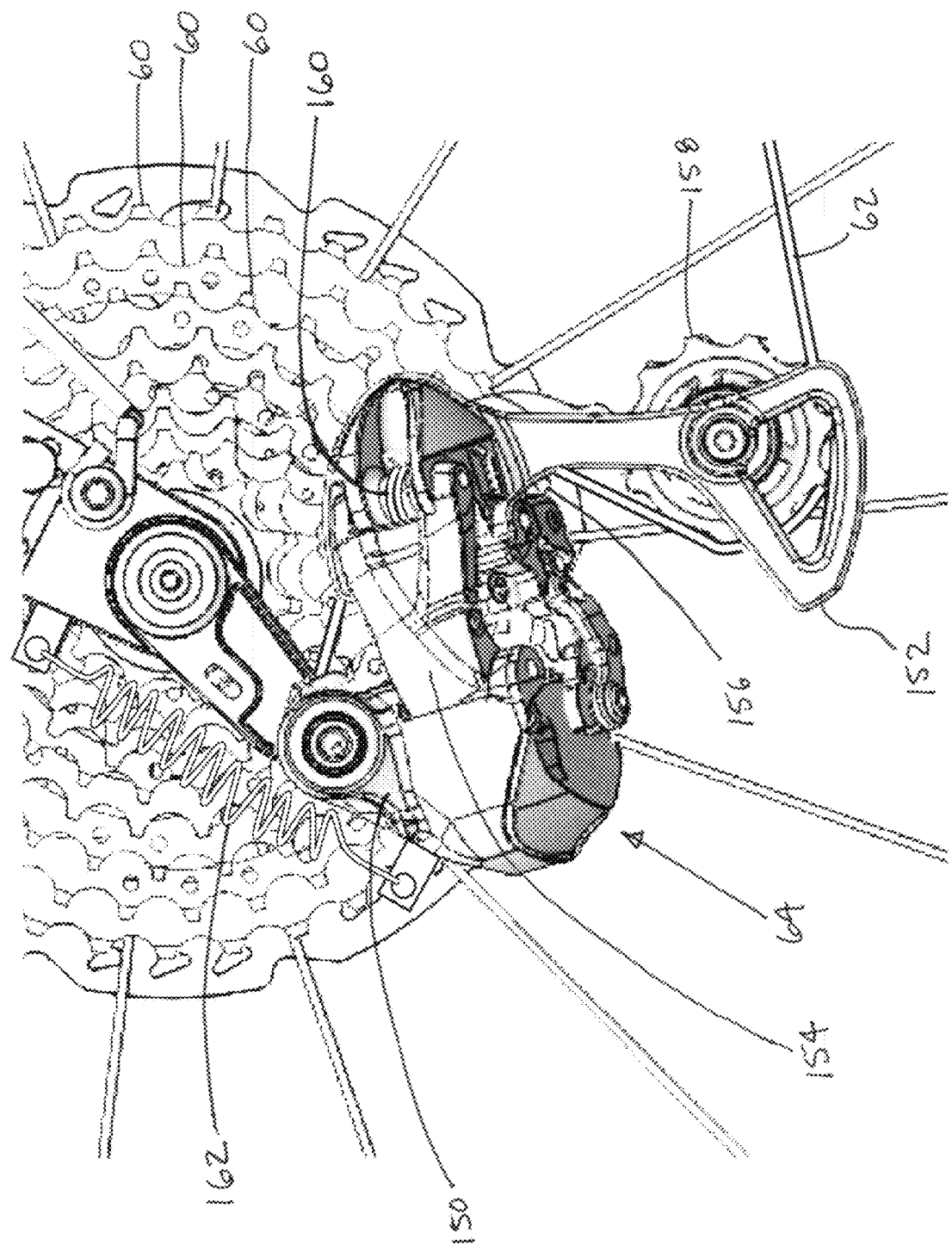
FIG. 8A is a magnified side elevation view of the derailleur shown in FIG. 8.

The derailleur arm 152 has a derailleur arm sprocket 158 rotatably mounted thereon, which is engaged with the chain 62, such that movement of the derailleur arm 152 relative to the derailleur base 150 controls tension in the chain 62. A derailleur arm biasing member 160 seen in FIG. 8A (e.g. a torsion spring) urges the derailleur arm 152 in a direction that applies tension to the chain 62 when the first and second frame portions are in the unfolded position. A derailleur base biasing member 162 is provided and urges the derailleur base 150 in a direction that applies tension to the chain 62 when the first and second frame portions are in the folded position. The derailleur base biasing member 162 may be a tension spring as shown in FIGS. 8-10, however it may alternatively be any other kind of spring.

This arrangement permits the chain 62 to maintain tension even when the compactable bicycle 10 is in the storage position. It will be noted, however, that the derailleur 64 is not pivoted to a poor position by the biasing member 162 when the compactable bicycle 10 is in the use position shown in FIG. 8 (and FIG. 8A). This permits the derailleur 64 to maintain a good amount of chain wrap on the sprockets 60 during use.

Figure 13:
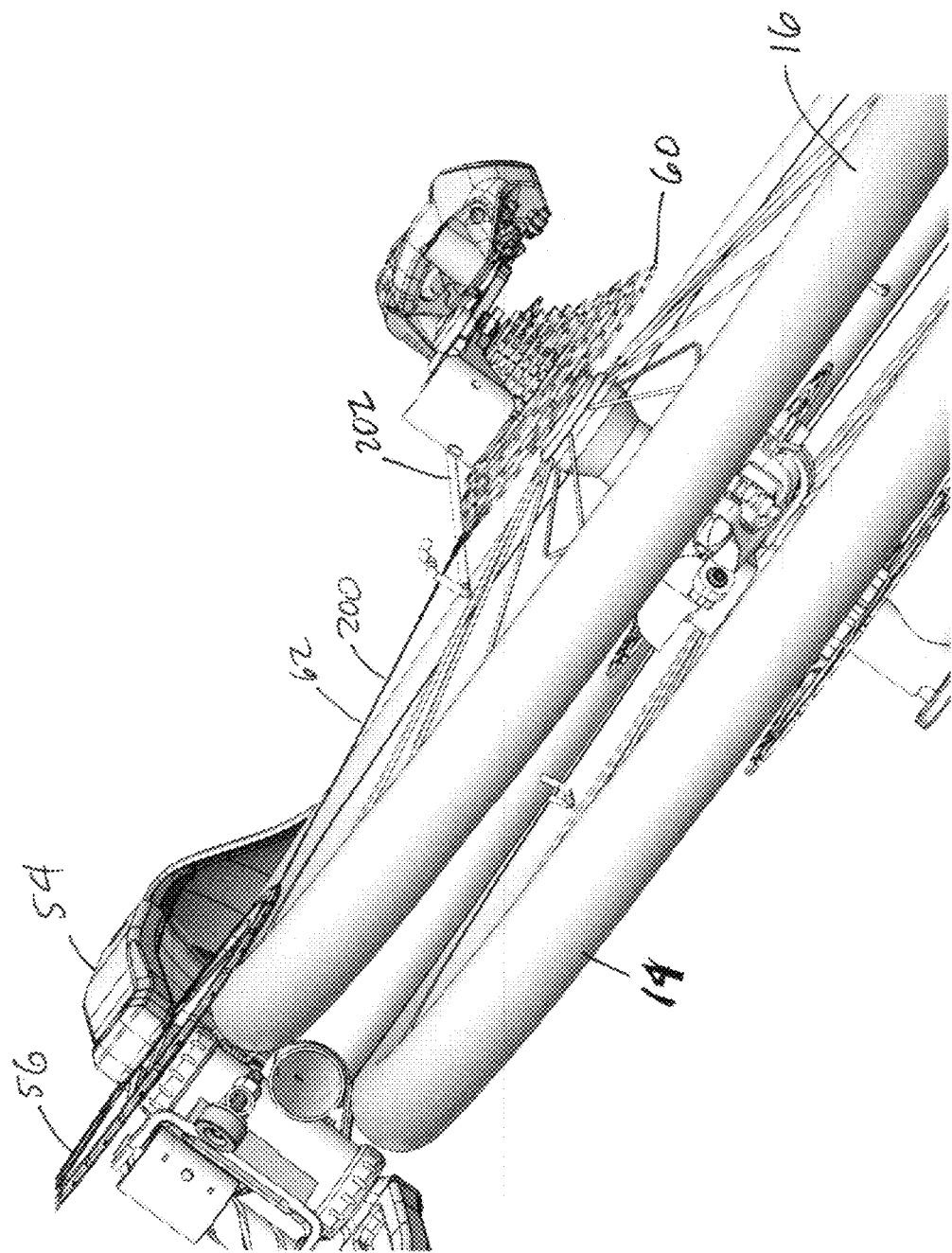
FIG. 13 is a perspective view of a portion of the bicycle, illustrating a chain guide.
Figure 16:
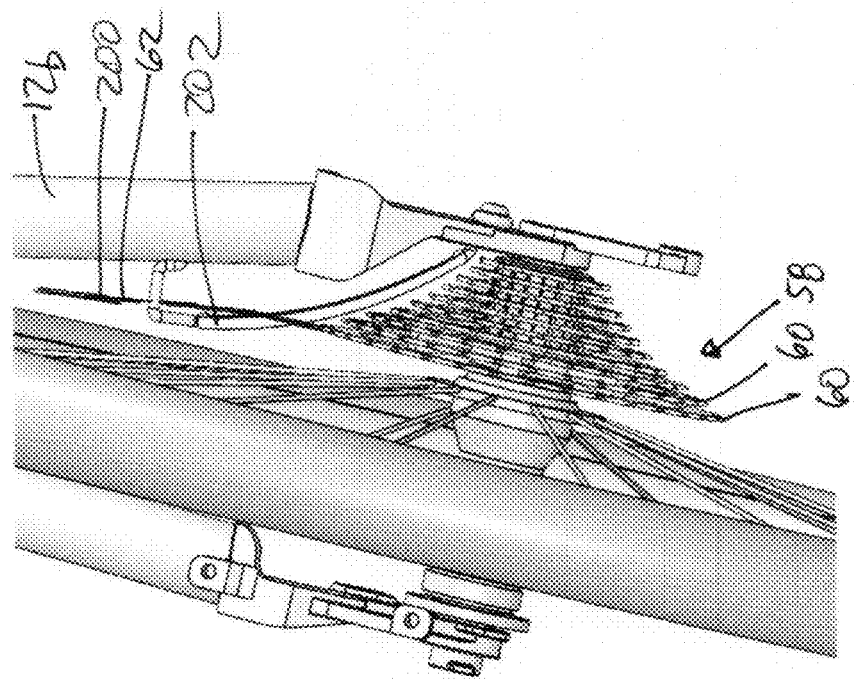
FIG. 16 is another perspective view of a portion of the bicycle, illustrating another alternative chain guide.

FIGS. 11-16 illustrate an improvement that keeps the chain 62 on the sprockets 60 when the compactable bicycle 10 is in the storage position. It will be noted in FIG. 11 that when the first and second frame portions are in the unfolded position (FIG. 11), the front sprocket 56 and a given rear sprocket 60 (in this example, the largest rear sprocket 60, just as an example) have a first lateral spacing L1 from one another. When the first and second frame portions are in the folded position (FIGS. 12-14), the front sprocket 56 and the rear sprocket 60 have a second lateral spacing L2 from one another that is larger than the first lateral spacing L1 from one another. A first span 200 of the chain 62 extends directly from the front sprocket 56 to the rear sprocket 60. The chain 62 is shown only schematically in many of the figures. A chain guide 202 is positioned to be spaced from the chain 62 when the front sprocket 56 and the rear sprocket 60 have the first lateral spacing L1 from one another, and is positioned to engage the chain 62 and to limit a lateral angle of the chain 62 relative to the rear sprocket 60 when the front sprocket 56 and the rear sprocket 60 have the second lateral spacing L2 from one another. The rear sprocket 60 may be referred to as a first rear sprocket from a plurality of rear sprockets 60 that are part of a rear cassette. Engagement of the chain 62 between the front sprocket 56 and any sprocket 60 from the plurality of rear sprockets 60 operatively connects the front sprocket 56 and crank 54 to the first rear sprocket 60 and to the rear cassette 58 overall. FIGS. 13 and 14 have some elements of the frame 12 missing so as to avoid obstructing the view of the chain guide 200 and other elements.

Figure 15:
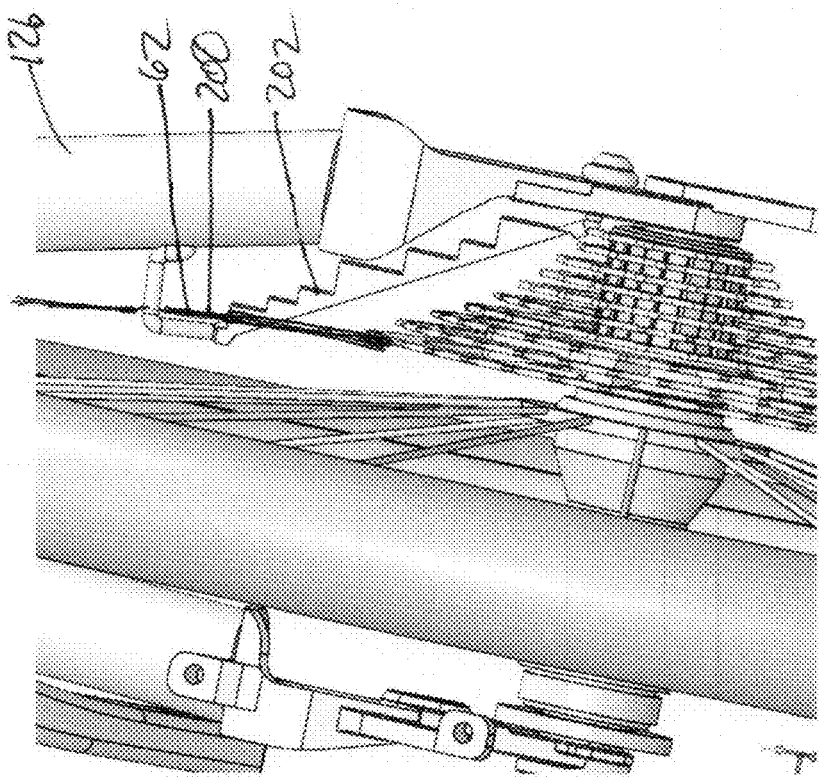
FIG. 15 is another perspective view of a portion of the bicycle, illustrating an alternative chain guide.

In an alternative embodiment shown in FIG. 15 the chain guide 202 is stepped and limits the lateral angle of the chain 62 relative to each of the rear sprockets 60 from the plurality of rear sprockets 60 to zero degrees, when the front sprocket 56 and the rear sprocket 60 have the second lateral spacing L2 from one another. In another alternative embodiment shown in FIG. 16 the chain guide 202 is curved to maintain a consistent distance from each of the rear sprockets 60 so that it works similarly for each rear sprocket. However, the chain guide 202 shown in FIGS. 12-14 would operate acceptably for all the rear sprockets 60.

Figure 17:
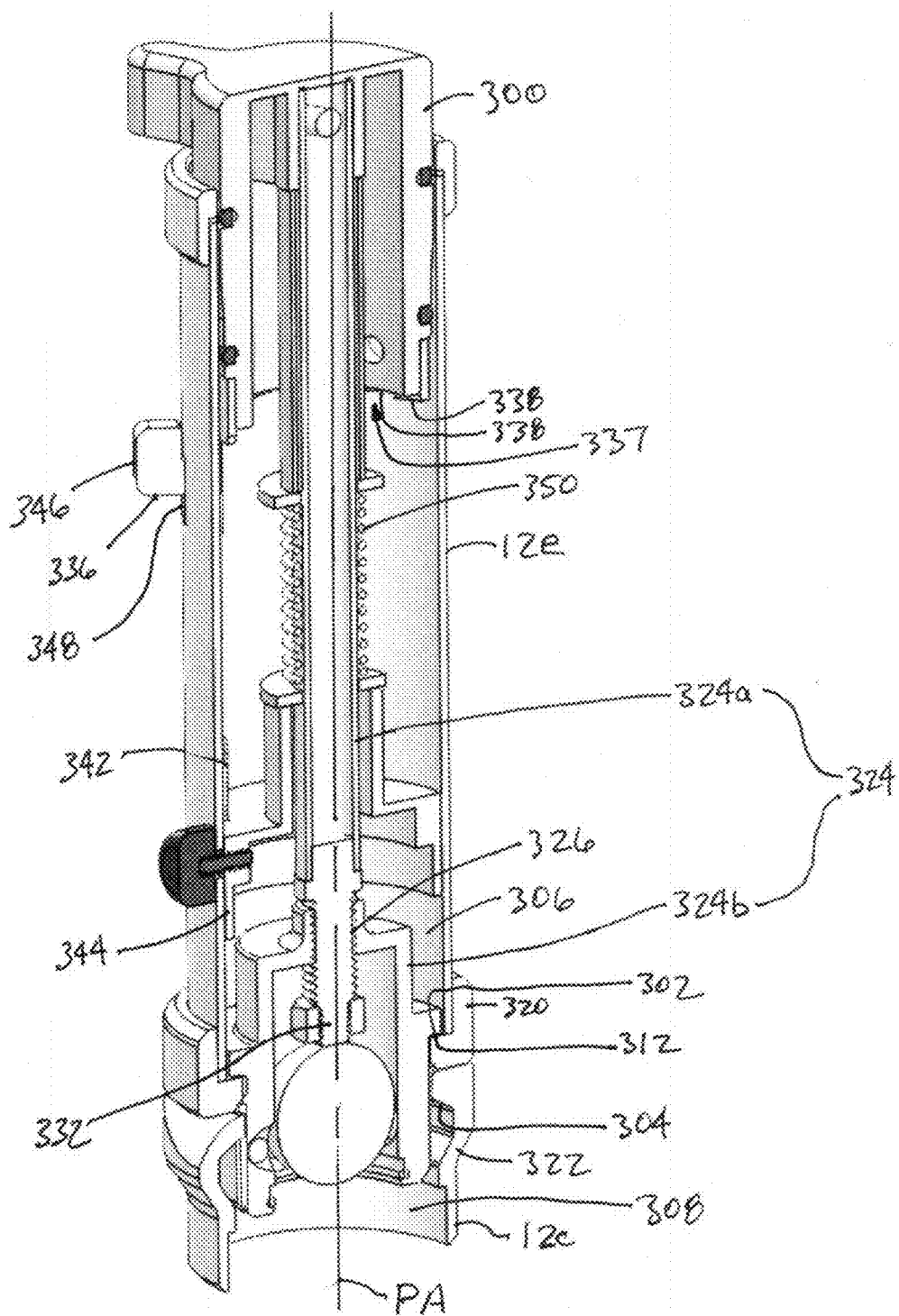
FIG. 17 is a sectional perspective view of a locking system from the bicycle.
Figure 18:
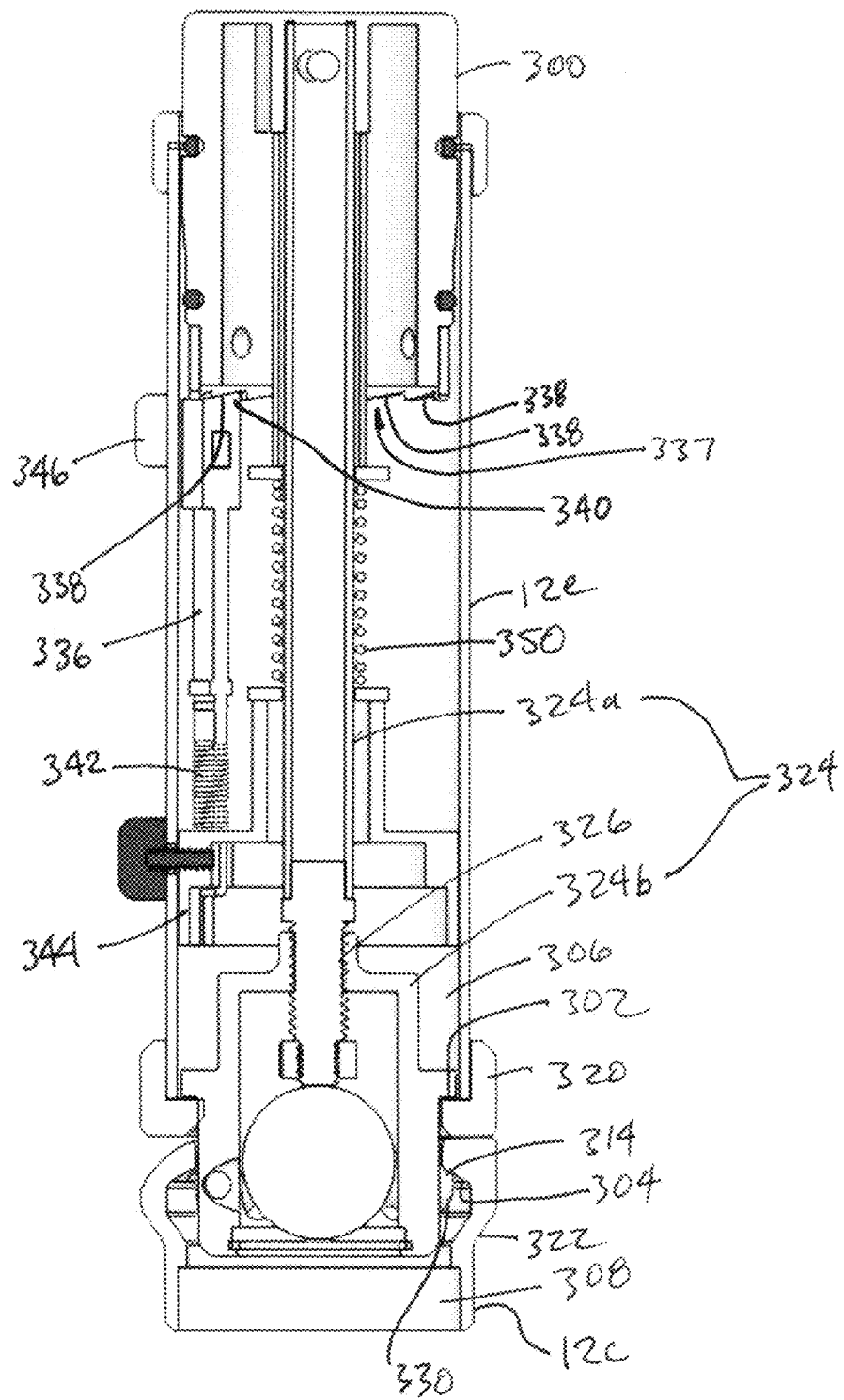
FIG. 18 is a sectional side elevation view of the locking system shown in FIG. 17 in a locking position.
Figure 19:
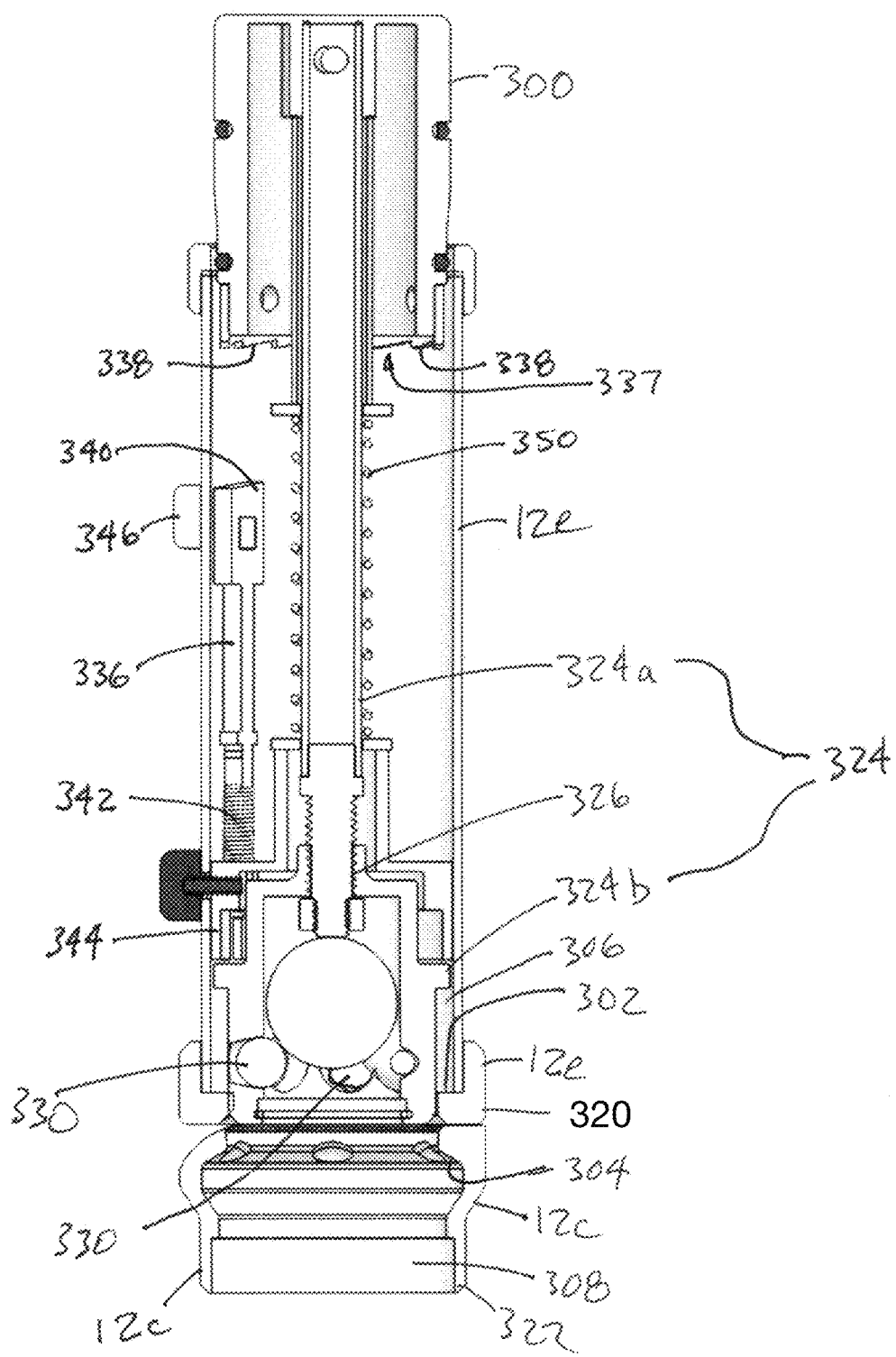
FIG. 19 is a sectional side elevation view of the locking system shown in FIG. 17 in a release position.

FIGS. 17-19 show an improvement in a locking system for locking frame portions together. In this example the first frame portion is the frame portion 12e and the second frame portion is the frame portion 12d. In this example, the compactable bicycle 10 includes a plunger 300 having a first plunger locking surface 312, a second plunger locking surface 314, wherein the plunger 300 is movable to a clamping position (FIGS. 17 and 18) in which the plunger 300 extends in both first and second apertures (shown at 306 and 308) in the first and second frame portions 12e and 12c, such that the first plunger locking surface 312 engages a first frame element locking surface 302 and the second plunger locking surface 314 engages the second frame element locking surface 304. In the embodiment shown, when the plunger 300 is in the clamping position the first and second ends (shown at 320 and 322 respectively) of the first and second frame portions 12e and 12c are abutted with one another. The plunger 300 is movable to a release position (FIG. 19) in which the plunger 300 retracts from the second aperture 308 sufficiently to permit the first and second ends 320 and 322 to be separated from one another. The plunger 300 includes a plunger body 324 having a first plunger body portion 324a and a second plunger body portion 324b. The first and second plunger body portions 324a and 324b are connected together via a threaded connection 326, which is explained further below.

The plunger 300 has a plunger axis PA. The second plunger locking surface 314 may be one of a plurality of second plunger locking surfaces 314 provided on a plurality of plunger projections 330 (e.g. steel balls) that are movable radially relative to the second plunger body portion 324b. A plunger projection driver 332 is provided on the first plunger body portion 324a and is movable between a plunger projection retraction position (FIG. 19) in which the plunger projection driver 332 permits the plurality of plunger projections 330 to retract relative to the second plunger body portion 324b and a plunger projection extension position (FIGS. 17 and 18) in which the plunger projection driver 332 drives the plurality of plunger projections 330 to extend radially outwards from the second plunger body portion 324b to clamp against the second frame element locking surface. In the embodiment shown, the plunger projection driver 332 engages a main ball 334, which in turn, engages all of the plunger projections 330 as best seen in FIG. 19.

When the plunger 300 is in the plunger projection retraction position shown in FIG. 19, and the rider wishes to lock the first and second frame portions 12e and 12c together, the rider pushes the plunger deeper into the first frame portion 12e until there is engagement between the first plunger locking surface 312 and the first frame element locking surface 302. The user can then turn the first plunger body portion 324a relative to the second plunger body portion 324b, which drives the first plunger body portion 324a to drive the plunger projection driver 332 further into the second plunger body portion 324b, which in turn drives the main ball 334 to drive the plunger projections 330 outward until the second plunger locking surfaces 314 on the plunger projections 330 engage the second frame element locking surface 304, to clamp the first and second frame element locking surfaces 302 and 304, thereby clamping the first and second frame elements 12e and 12c together.

In order to permit the first plunger body portion 324a to be rotated relative to the second plunger body portion 324b, the second plunger body portion 324b may include a feature that engages a feature on at least one the first and second frame portions 12e and 12c to lock it circumferentially while permitting it to advance and retract axially. For example, the second plunger body portion 324b may include a longitudinal groove 333 that engages a projection 335 on the second plunger body portion 12c.

An optional feature for the plunger 300 is a plunger locking member 336 which holds the plunger 300 in place in the clamping position. In the present embodiment, the plunger 300 has a toothed surface 337 with a set of ratchet teeth 338 that extend circumferentially about the plunger 300. The plunger locking member 336 has a pawl 340 thereon, that is positionable in a locking position (FIG. 18) to lock the plunger 300 in place in the clamping position by preventing counterrotation of the first plunger body portion 324a relative to the second plunger body portion 324b, and in a release position in which the pawl 340 is retracted from the ratchet teeth 338. The plunger locking member 336 may be urged towards the locking position by a plunger locking member biasing member 342, which may, for example, be a compression spring acting between the plunger locking member 336 and an insert 344 that forms part of the first frame portion 12e. The ratchet teeth 338, the pawl 340 and the plunger locking member biasing member 342 are all inside the interior volume of the first frame portion 12e. However, an external projection 346 extends through a slot 348 in the first frame portion 12e for access by the rider, to move the plunger locking member 336 between the locking and release positions.

When the plunger 300 is in the position shown in FIG. 18, and the rider wishes to unlock the first and second frame portions 12e and 12c so that they can fold the compactable bicycle 10, the plunger locking member 336 is pushed to the release position, and then, while holding the plunger locking member 336 in the release position, the first plunger body portion 324a is counterrotated relative to the second plunger body portion 324b so as to retract the plunger projection driver 332 from the main ball 334. Once retracted sufficiently, the rider can pull up on the plunger 300. This upwards movement of the second plunger body portion 324b will cause the second frame element locking surface 304 to drive the plunger projections 330 radially inwardly, since there is no significant force holding the plunger projections 330 outward once the plunger projection driver 332 is retracted. The plunger 300 can then be completely withdrawn from the second frame portion 12c. Once the plunger 300 is withdrawn, the second frame portion 12c can be folded relative to the first frame portion 12c.

While the plunger projections 330 are balls in the embodiment shown, they may alternatively be other shapes, such as wedges.

Optionally, a plunger biasing member 350 may be provided to urge the plunger 300 towards the plunger projection retraction position. The plunger biasing member 350 may be, for example, a compression spring that acts between the first plunger body portion 324a and the insert 344. It is alternatively possible for a plunger biasing member to be provided by urges the plunger 300 towards the locking position shown in FIG. 18, however. For example, a compression spring may be provided between the insert 344 and an upper surface of the second plunger body portion 324b, thereby urging the second plunger body portion 324 to bring the first plunger locking surface 312 into engagement with the first frame element locking surface 302.

The pedals for the compactable bicycle 10 are only shown in FIG. 1. It will be understood that the crank 54 includes pedals in order to permit the rider 22 to ride the compactable bicycle 10.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The invention claimed is:

1. A compactable bicycle, comprising:
a frame including a first frame portion and a second frame portion, wherein the first frame portion has a steering structure rotatably mounted thereto, wherein the steering structure has a front wheel rotatably connected thereto, wherein the front wheel is positionable for rolling engagement with a ground surface for supporting the compactable bicycle thereon, wherein the steering structure further includes a handlebar positioned to be gripped by a rider for steering the front wheel during use of the compactable bicycle, and wherein the second frame portion has a rear wheel rotatably connected thereto, wherein the rear wheel is positionable for rolling engagement with the ground surface for supporting the compactable bicycle thereon, wherein the compactable bicycle is unfoldable to a use position for riding by the rider, and is foldable to a storage position for storage;
a rear brake that is actuatable to brake the rear wheel;
a rear brake lever positioned on the handlebar for actuation by the rider;
a rear brake cable that extends between the rear brake lever and the rear brake to operatively connect the rear brake lever to the rear brake, and passes through a first cable guide on the first frame portion en route between the rear brake lever and the rear brake, wherein a first segment of the rear brake cable extends between the rear brake lever and the first cable guide when the compactable bicycle is in the use position, wherein, a change in position of the first and second frame portions relative to one another during folding of the compactable bicycle to the storage position pulls a first portion of the first segment of the rear brake cable through the first cable guide in a first direction; and
a brake cable biasing member that is positioned to urge the first portion of the first segment of the rear brake cable back through the first cable guide to be between the first cable guide and the rear brake lever.

2. A compactable bicycle as claimed in claim 1, wherein the brake cable biasing member is a compression spring that has a first end that is engaged with the first segment and a second end that is engaged with the first frame portion.

3. A compactable bicycle as claimed in claim 1, wherein the second frame portion is pivotable about the first frame portion about a laterally extending axis during folding and unfolding of the compactable bicycle.

4. A compactable bicycle as claimed in claim 1, further comprising:
a crank and a front sprocket that are rotatable about a crank axis;
a rear cassette on the rear wheel, having a plurality of rear sprockets;
a chain that operatively connects the front sprocket and crank to the rear cassette;
a derailleur that is actuatable to change which of the rear sprockets the chain is on;

a gear control positioned on the handlebar for actuation by the rider;
a derailleur cable that extends between the gear control and the derailleur to operatively connect the gear control to the derailleur, and passes through the first cable guide on the first frame portion en route between the gear control and the derailleur,
wherein a first segment of the derailleur cable extends between the gear control and the first cable guide when the compactable bicycle is in the use position, wherein, the change in position of the first and second frame portions relative to one another during folding of the compactable bicycle to the storage position pulls a first portion of the first segment of the derailleur cable through the first cable guide in the first direction, and wherein the derailleur cable is connected to the rear brake cable such that urging of the first portion of the first segment of the rear brake cable back through the first cable guide by the brake cable biasing member also urges the first portion of the first segment of the derailleur cable back through the first cable guide to be between the first cable guide and the gear control.

5. A compactable bicycle, comprising:
a frame including a first frame portion and a second frame portion, wherein the first frame portion has a steering structure rotatably mounted thereto, wherein the steering structure has a front wheel rotatably connected thereto, wherein the front wheel is positionable for rolling engagement with a ground surface for supporting the compactable bicycle thereon, wherein the steering structure further includes a handlebar positioned to be gripped by a rider for steering the front wheel during use of the compactable bicycle, and wherein the second frame portion has a rear wheel rotatably connected thereto, wherein the rear wheel is positionable for rolling engagement with the ground surface for supporting the compactable bicycle thereon, wherein the compactable bicycle is positionable in a use position for riding by a rider, wherein in the use position the first and second frame portions are unfolded to an unfolded position, and wherein the compactable bicycle is positionable in a storage position for storage, wherein in the storage position the first and second frame portions are folded to a folded position;
a crank and a front sprocket that are rotatable about a crank axis;
a rear cassette on the rear wheel, having a plurality of rear sprockets;
a chain that operatively connects the front sprocket and crank to the rear cassette, wherein, when the first and second frame portions are in the unfolded position, the front sprocket and the rear cassette have a first center distance, and when the first and second frame portions are in the folded position, the front sprocket and the rear cassette have a second center distance that is shorter than the first center distance; and
a derailleur that is actuatable to change which of the rear sprockets the chain is on, wherein the derailleur includes:
  a derailleur base that is movably connected to the frame,
  a derailleur arm that is movably connected to the derailleur base, wherein the derailleur arm has a derailleur arm sprocket rotatably mounted thereon, which is engaged with the chain, such that movement of the derailleur arm relative to the derailleur base controls tension in the chain,
  a derailleur arm biasing member that urges the derailleur arm in a direction that applies tension to the chain when the first and second frame portions are in the unfolded position, and
  a derailleur base biasing member that urges the derailleur base in a direction that applies tension to the chain when the first and second frame portions are in the folded position.

6. A compactable bicycle as claimed in claim 5, wherein the derailleur further includes a derailleur linkage and a jockey sprocket, wherein the derailleur linkage is movably connected to the base and is actuatable to move the jockey sprocket relative to the rear cassette to change which of the rear sprockets the chain is on, and wherein the derailleur arm is pivotably connected to the derailleur linkage, wherein the compactable bicycle further comprises
a gear control positioned on the handlebar for actuation by the rider;
a derailleur cable that extends between the gear control and the derailleur to operatively connect the gear control to the derailleur.

7. A compactable bicycle, comprising:
a frame including a first frame portion and a second frame portion, wherein the first frame portion has a steering structure rotatably mounted thereto, wherein the steering structure has a front wheel rotatably connected thereto, wherein the front wheel is positionable for rolling engagement with a ground surface for supporting the compactable bicycle thereon, wherein the steering structure further includes a handlebar positioned to be gripped by a rider for steering the front wheel during use of the compactable bicycle, and wherein the second frame portion has a rear wheel rotatably connected thereto, wherein the rear wheel is positionable for rolling engagement with the ground surface for supporting the compactable bicycle thereon, wherein the compactable bicycle is positionable in a use position for riding by a rider, wherein in the use position the first and second frame portions are unfolded to an unfolded position, and wherein the compactable bicycle is positionable in a storage position for storage, wherein in the storage position the first and second frame portions are folded to a folded position;
a crank and a front sprocket that are rotatable about a crank axis;
a rear sprocket on the rear wheel;
a chain that operatively connects the front sprocket and crank to the rear sprocket, wherein, when the first and second frame portions are in the unfolded position, the front sprocket and the rear sprocket have a first lateral spacing from one another, and when the first and second frame portions are in the folded position, the front sprocket and the rear sprocket have a second lateral spacing from one another that is larger than the first lateral spacing from one another, wherein a first span of the chain extends directly from the front sprocket to the rear sprocket;
a chain guide that is positioned to be spaced from the chain when the front sprocket and the rear sprocket have the first lateral spacing from one another, and is positioned to engage the chain and to limit a lateral angle of the chain relative to the rear sprocket when the front sprocket and the rear sprocket have the second lateral spacing from one another,
wherein the rear sprocket is a first rear sprocket from a plurality of rear sprockets that are part of a rear cassette and wherein engagement of the chain between the front sprocket and any sprocket from the plurality of rear sprockets operatively connects the front sprocket and crank to the first rear sprocket and to the rear cassette overall, wherein the chain guide is stepped and limits the lateral angle of the chain relative to each of the rear sprockets from the plurality of rear sprockets to zero degrees, when the front sprocket and the rear sprocket have the second lateral spacing from one another.

\* \* \* \* \*